(12) United States Patent
Montross et al.

(10) Patent No.: US 10,485,296 B2
(45) Date of Patent: Nov. 26, 2019

(54) ARTICLE OF FOOTWEAR HAVING A MIDSOLE WITH MULTIPLE PORTIONS AND METHOD OF MAKING THE SAME

(71) Applicant: Reebok International Limited, London (GB)

(72) Inventors: Matthew Montross, Middleboro, MA (US); Jeff Acheson, Canton, MA (US); Dan Buonomo, Waltham, MA (US)

(73) Assignee: Reebok International Limited, London (GB)

( * ) Notice: Subject to any disclaimer, the term of this patent is extended or adjusted under 35 U.S.C. 154(b) by 330 days.

(21) Appl. No.: 15/336,592

(22) Filed: Oct. 27, 2016

(65) Prior Publication Data

US 2018/0116337 A1 May 3, 2018

(51) Int. Cl.
*A43D 8/00* (2006.01)
*A43B 13/18* (2006.01)
(Continued)

(52) U.S. Cl.
CPC ............ *A43B 13/186* (2013.01); *A43B 5/002* (2013.01); *A43B 5/02* (2013.01); *A43B 5/06* (2013.01);
(Continued)

(58) Field of Classification Search
CPC ..... A43B 13/186; A43B 13/023; A43B 13/04; A43B 13/127; A43B 13/16; A43B 13/188; A43B 13/12; A43B 7/144; A43B 13/125; B29D 35/0054; B29D 35/122; B29D 35/142
(Continued)

(56) References Cited

U.S. PATENT DOCUMENTS

| 1,370,797 A | * | 3/1921 | Egerton | A43B 13/32 2/275 |
| 2,217,913 A | * | 10/1940 | Maling | A43B 21/00 36/30 R |
| 2,456,659 A | * | 12/1948 | Weidner | A43B 15/00 36/30 R |
| 2,673,995 A | * | 4/1954 | Ridderstrom | A43B 13/00 12/146 BP |

(Continued)

FOREIGN PATENT DOCUMENTS

EP 1 491 574 A1 12/2004
FR 2995207 A1 * 3/2014 ............. A43B 17/18
(Continued)

OTHER PUBLICATIONS

Partial European Search Report issued in European Patent Application No. 17197740.8, dated Mar. 1, 2018, 12 pages.

*Primary Examiner* — Jameson D Collier
(74) *Attorney, Agent, or Firm* — Sterne, Kessler, Goldstein & Fox, P.L.L.C.

(57) ABSTRACT

Articles of footwear and soles. The article of footwear may include an upper, a midsole with a midsole core and a midsole rim, and an outsole. The midsole core may be manufactured from a plurality of portions that are arranged in a particular order before being placed in a mold. The plurality of portions may be arranged so that the portions at least partially overlap each other. The plurality of portions may be arranged in longitudinal strips. The plurality of portions may be arranged in lateral portions. The plurality of portions may be adhered to each other before being placed in the mold. The mold may apply heat and pressure for a predetermined amount of time to form the midsole.

16 Claims, 6 Drawing Sheets

(51) Int. Cl.
*A43B 5/00* (2006.01)
*A43B 5/02* (2006.01)
*A43B 5/06* (2006.01)
*A43B 5/10* (2006.01)
*A43B 5/12* (2006.01)
*A43B 13/04* (2006.01)
*B29D 35/00* (2010.01)
*B29D 35/14* (2010.01)
*A43B 13/02* (2006.01)
*A43B 13/16* (2006.01)
*B29D 35/12* (2010.01)
*A43B 13/12* (2006.01)
*A43B 13/14* (2006.01)

(52) U.S. Cl.
CPC ............... *A43B 5/10* (2013.01); *A43B 5/12* (2013.01); *A43B 13/023* (2013.01); *A43B 13/04* (2013.01); *A43B 13/16* (2013.01); *B29D 35/0054* (2013.01); *B29D 35/122* (2013.01); *B29D 35/142* (2013.01); *A43B 5/00* (2013.01); *A43B 13/127* (2013.01); *A43B 13/141* (2013.01); *A43B 13/188* (2013.01)

(58) Field of Classification Search
USPC ............... 36/30 R, 25 R, 35 R, 28, 91, 92; 12/146 B, 146 BP
See application file for complete search history.

(56) References Cited

U.S. PATENT DOCUMENTS

| | | | |
|---|---|---|---|
| 5,503,786 A | 4/1996 | Yang | |
| 6,129,798 A | 10/2000 | Yang | |
| 6,299,806 B1 | 10/2001 | Chen et al. | |
| 7,056,459 B2 * | 6/2006 | Park | B29D 35/0054 264/156 |
| 7,797,856 B2 * | 9/2010 | Andrews | A43B 13/12 36/25 R |
| 2004/0154192 A1 * | 8/2004 | Bengtsson | A43B 7/1415 36/30 R |
| 2005/0258560 A1 | 11/2005 | Chen et al. | |
| 2007/0295451 A1 * | 12/2007 | Willis | A43B 7/144 156/306.6 |
| 2008/0016724 A1 * | 1/2008 | Hlavac | A43B 13/12 36/30 R |
| 2011/0016746 A1 * | 1/2011 | Callahan | A43B 3/0057 36/28 |
| 2011/0179669 A1 * | 7/2011 | Hanebrink | A43B 7/144 36/28 |
| 2014/0331517 A1 * | 11/2014 | Seo | A43B 7/1405 36/28 |
| 2016/0066647 A1 * | 3/2016 | Handorf | A43B 7/1425 36/44 |

FOREIGN PATENT DOCUMENTS

| | | | | |
|---|---|---|---|---|
| WO | WO-2005025446 A2 * | 3/2005 | ............ | A43B 13/026 |
| WO | WO-2015046706 A1 * | 4/2015 | ............ | A43B 3/0078 |

* cited by examiner

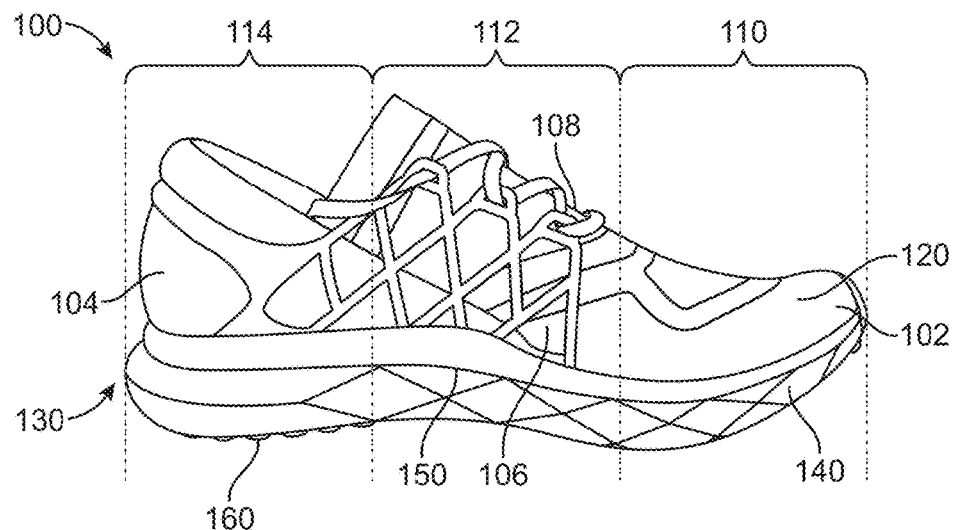
FIG. 1
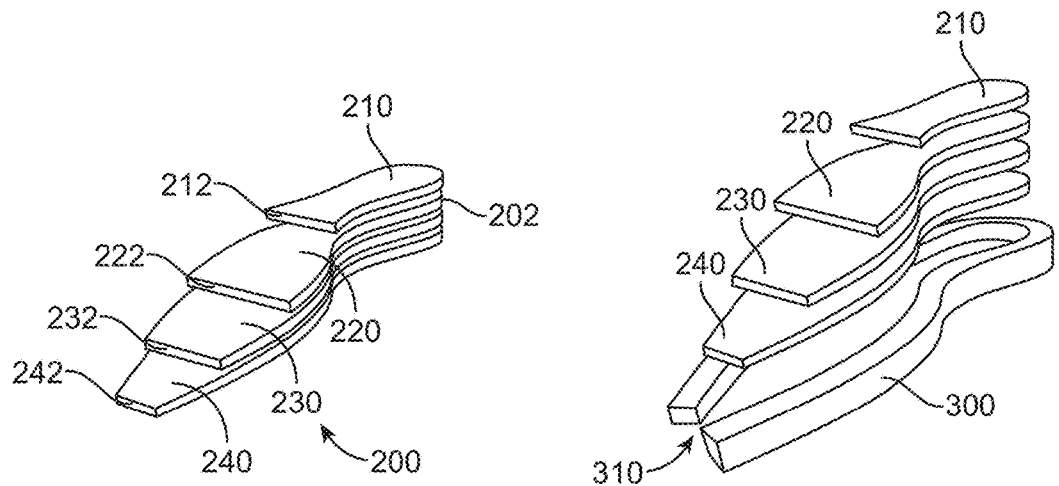
FIG. 2
FIG. 3

ARTICLE OF FOOTWEAR HAVING A MIDSOLE WITH MULTIPLE PORTIONS AND METHOD OF MAKING THE SAME

BACKGROUND

Field of the Invention

The described embodiments generally relate to an article of footwear having a midsole and methods of making the same. In particular, embodiments of the present invention relate to an article of footwear having a midsole including multiple portions of thermoplastic elastomer foam.

Background Art

Individuals are often concerned with the amount of cushioning an article of footwear provides. This is true for articles of footwear worn for non-performance activities, such as a leisurely stroll, and for performance activities, such as running, because throughout the course of an average day, the feet and legs of an individual are subjected to substantial impact forces. When an article of footwear contacts a surface, considerable forces may act on the article of footwear and, correspondingly, the wearer's foot. The sole of an article of footwear functions, in part, to provide cushioning to the wearer's foot and to protect it from these forces.

The human foot is a complex and remarkable piece of machinery, capable of withstanding and dissipating many impact forces. The natural padding of fat at the heel and forefoot, as well as the flexibility of the arch, help to cushion the foot. Although the human foot possesses natural cushioning and rebounding characteristics, the foot alone is incapable of effectively overcoming many of the forces encountered during every day activity. Unless an individual is wearing shoes that provide proper cushioning and support, the soreness and fatigue associated with every day activity is more acute, and its onset may be accelerated. This discomfort for the wearer may diminish the incentive for further activity. Equally important, inadequately cushioned footwear can lead to injuries such as blisters; muscle, tendon and ligament damage; and bone stress fractures. Improper footwear can also lead to other ailments, including back pain.

Proper footwear should complement the natural functionality of the foot, in part, by incorporating a sole which absorbs shocks. Therefore, a continuing need exists for innovations in providing cushioning and support to articles of footwear.

SUMMARY

Some embodiments are directed to a method of manufacturing a midsole of an article of footwear from a sheet of thermoplastic elastomer foam. The method includes cutting a plurality of portions from one or more thermoplastic elastomer foam sheets, arranging the plurality of portions to form a pre-molded core of the midsole, placing the arranged plurality of portions in a mold, and applying heat and pressure to the plurality of portions for a predetermined amount of time to form the midsole. In some embodiments, the plurality of portions are adhered to each other to form the core of the midsole.

In some embodiments, the plurality of portions for the pre-molded midsole include, a first layer that extends from a heel of the midsole to an arch of the midsole, a second layer that extends from a heel of the midsole to a midportion of the midsole, a third layer that extends from a heel of the midsole to a ball of the foot of the midsole, and a fourth layer that extends from a heel of the midsole to a toe of the midsole. The layers may be arranged so that each layer at least partially overlaps the other layers.

In some embodiments, the plurality of portions for the pre-molded midsole include a forefoot portion that extends from a toe of the midsole to a front of an arch of the midsole, a midfoot portion that extends from the front of the arch of the midsole to a rear of the arch of the midsole, and a heel portion that extends from the rear of the arch of the midsole to the heel of the midsole. The portions may be arranged with each other in a single layer, with the forefoot portion arranged next to the midfoot portion, and the midfoot portion arranged next to the heel portion.

In some embodiments, the plurality of portions for the pre-molded midsole may include a plurality of longitudinal strips that extend from a forefoot end to a heel end of the midsole. The sides of the longitudinal strips may be arranged next to one another in a width wide direction of the midsole.

Some embodiments are directed towards an article of footwear including an outsole and a rim that are adhered to a midsole. The midsole is pre-molded from a plurality of portions comprising polyether block amide.

In some embodiments, the plurality of portions for the pre-molded midsole include, a first layer that extends from a heel of the midsole to an arch of the midsole, a second layer that extends from a heel of the midsole to a midportion of the midsole, a third layer that extends from a heel of the midsole to a ball of the foot of the midsole, and a fourth layer that extends from a heel of the midsole to a toe of the midsole. The layers may be arranged so that each layer at least partially overlaps the other layers.

In some embodiments, the plurality of portions for the pre-molded midsole include a forefoot portion that extends from a toe of the midsole to a front of an arch of the midsole, a midfoot portion that extends from the front of the arch of the midsole to a rear of the arch of the midsole, and a heel portion that extends from the rear of the arch of the midsole to the heel of the midsole. The portions may be arranged with each other in a single layer, with the forefoot portion arranged next to the midfoot portion, and the midfoot portion arranged next to the heel portion.

In some embodiments, the plurality of portions for the pre-molded midsole may include a plurality of longitudinal strips that extend from a forefoot end to a heel end of the midsole. The sides of the strips may be arranged next to one another in a width wide direction of the midsole.

BRIEF DESCRIPTION OF THE DRAWINGS

FIG. 1 illustrates an article of footwear with a midsole having a plurality of pre-molding midsole portions according to an embodiment.

FIG. 2 illustrates a midsole core of an article of footwear having a plurality of pre-molding portions arranged with at least partially overlapping layers according to an embodiment.

FIG. 3 illustrates an exploded view of a midsole core of an article of footwear having a plurality of pre-molding portions arranged with at least partially overlapping layers and having a midsole rim according to an embodiment.

DETAILED DESCRIPTION

Figure 4:
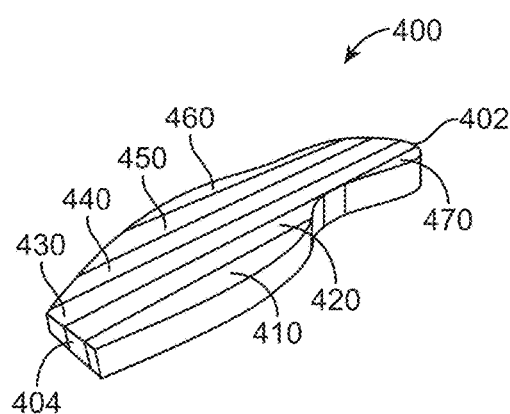
FIG. 4 illustrates a midsole core of an article of footwear having a plurality of pre-molding portions arranged in longitudinal strips according to an embodiment.

The present invention will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described When an article of footwear contacts a surface, considerable forces may act on the article of footwear and, correspondingly, a wearer's foot. The natural padding of fat at the heel and forefoot, as well as the flexibility of the arch, help to cushion the foot. Although the human foot possesses natural cushioning and rebounding characteristics, the foot alone is incapable of effectively overcoming many of the forces encountered during every day activity. Unless an individual is wearing footwear (e.g., shoes) that provides proper cushioning and support, the soreness and fatigue associated with every day activity is more acute, and its onset may be accelerated. The added cushioning provided by an article of footwear, and particularly the sole of the article of footwear, reduces potential discomfort for an individual. Discomfort experienced during an activity, for example, exercise, may diminish the incentive for further activity, which can be detrimental to an individual's wellbeing.

An article of footwear, and particularly the sole of an article of footwear, can be configured to provide various amounts cushioning and/or stability to a wearer's foot. But the cost and efficiency of manufacturing the article of footwear is a consideration. A sole configured to provide desired cushioning and that may be manufactured at a relatively low cost may be desirable for manufactures and consumers. A sole that can be manufactured using a relatively small amount of resources (e.g., energy and man power), materials, and time reduces manufacturing costs and may also reduce the environmental impact of manufacturing the sole.

In some embodiments, the article of footwear discussed herein may include a midsole that functions to provide desired cushioning and/or stability for an individual's foot. In some embodiments, the midsole may comprise multiple portions that are molded together via, for example, compression molding. The construction of the midsoles discussed herein may reduce waste and thus reduce manufacturing costs and environmental impact.

FIG. 1 illustrates an article of footwear 100 having an upper 120 coupled to a sole 130. Sole 130 may include a midsole having a midsole core 140 and a midsole rim 150, and an outsole 160. Alternatively, the midsole may simply be the midsole core 140 without the midsole rim 150. Article of footwear 100 may include a forefoot end 102, a heel end 104, a medial side 106, and a lateral side 108 opposite medial side 106. Article of footwear 100 may further include a forefoot portion 110, a midfoot portion 112, and a heel portion 114. Portions 110, 112, and 114 are not intended to demarcate precise areas of article of footwear 100; rather, portions 110, 112, and 114 are intended to represent general areas of article of footwear 100 that provide a frame of reference for describing article of footwear 100. Although portions 110, 112, and 114 apply generally to article of footwear 100, references to portions 110, 112, and 114 may also apply specifically to upper 120, midsole core 140, midsole rim 150, and outsole 160, or individual components of upper 120, midsole core 140, midsole rim 150, and outsole 160. The length direction of article of footwear 100 extends from forefoot end 102 to heel end 104. The width direction of article of footwear 100 extends from medial side 106 to lateral side 108.

Article of footwear 100 including upper 120 and sole 130 may be configured for a specific type of footwear, including, but not limited to, a running shoe, a hiking shoe, a dancing shoe, a biking shoe, a tennis shoe, a cleat (e.g., a baseball cleat or a football cleat), a basketball shoe, a boot, a walking shoe, a casual shoe, or a dress shoe. Moreover, the midsole and outsole 160 may be sized and shaped to provide a desired combination of cushioning, stability, and ride characteristics to article of footwear 100. The term "ride" may be used herein in describing some embodiments as an indication of the sense of smoothness or flow occurring during a gait cycle including heel strike, midfoot stance, toe off, and the transitions between these stages. In some embodiments, the midsole and/or outsole 160 may provide particular ride features including, but not limited to, appropriate control of pronation and supination, support of natural movement, support of unconstrained or less constrained movement, appropriate management of rates of change and transition, and combinations thereof. Upper 120 may be manufactured from leather, canvas, nylon, combinations of these materials, or other suitable materials. In some embodiments, upper 120 may include a liner, waterproofing, or other accessories.

The midsole provides cushioning, ride, and/or stability for an individual's foot. Different types of materials may be used to fabricate the midsole to provide differing amounts of cushioning and/or stability for the individual user. Suitable materials for the including midsole core 140 and midsole rim 150, and outsole 160 may include, but are not limited to, foam, rubber, ethyl vinyl acetate (EVA), compressed molded ethyl vinyl acetate (CMEVA), thermoplastic polyurethane (TPU), expanded thermoplastic polyurethane (eTPU), thermoplastic rubber (TPR), and thermoplastic polyurethane (PU). In some embodiments, the foam may comprise, for example, an EVA based foam or a PU based foam and the foam may be an open-cell foam or a closed-cell foam.

In some embodiments, the midsole and/or outsole 160 may comprise elastomers, thermoplastic elastomers (TPE), foam-like plastics, and gel-like plastics. An example of a TPE that may be used to fabricate the midsole is polyether block amide (PEBA), including but not limited to, a PEBA manufactured by Arkema under the tradename PEBAX® or a PEBA manufactured by Evonik Industries sold under the tradename VESTAMID®.

These different types of materials listed above used in the fabrication of the midsole and outsole 160 ranges in costs, weight, density, and the like. The cost of the material for manufacturing the midsole may be dependent upon the amount of comfort that the material provides to the user during use. Typically, the more comfortable the material, the more expensive the material is. Thus, the more comfortable materials may raise the overall costs of manufacturing article of footwear 100. In an effort to reduce manufacturing expenses and curb manufacturing waste, the midsole may be manufactured using a method that minimizes that amount of material that is wasted during the manufacturing process for the midsole.

Figure 14:
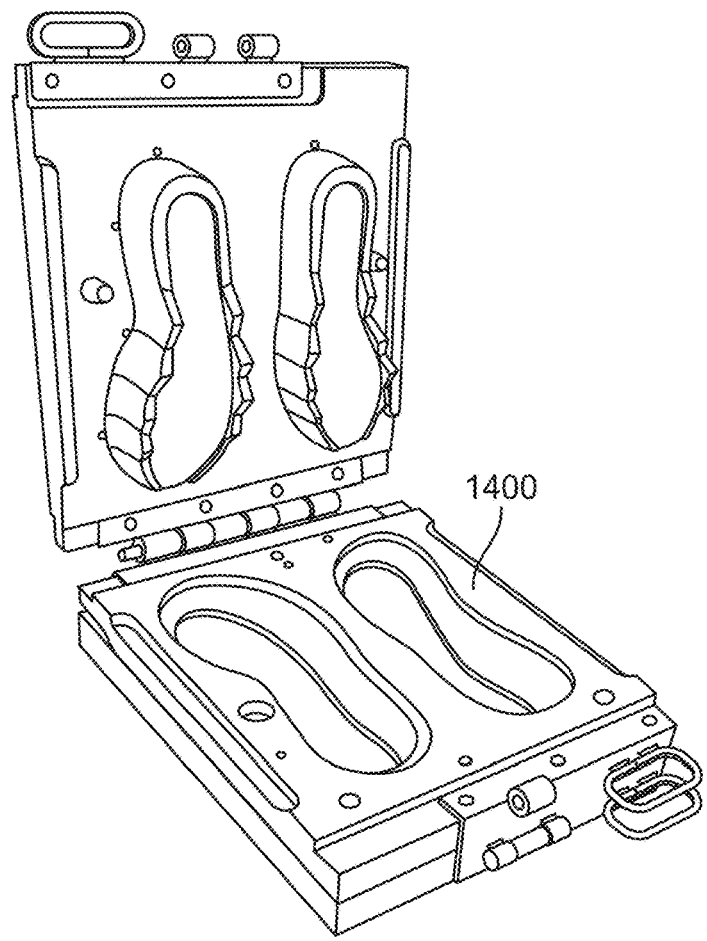
FIG. 14 illustrates a mold for forming a midsole with a plurality of pre-molding portions according to an embodiment.

In some embodiments, midsole core 140 may be fabricated from multiple smaller portions instead of a larger piece for the entire midsole (e.g., pre-molding or pre-fabrication portions). In this manner, portions may be cut from a material sheet (such as, for example, a TPE foam sheet) in a manner that minimizes the waste produced. The portions may be arranged in a particular order before being placed in the mold or the portions may be adhered together by adhesive bonding, stitching, welding, a combination thereof, or any other suitable means before being placed in the mold. The multiple portions of midsole core 140 may also be arranged in a particular order with midsole rim 150 and outsole 160 with or without adhering the portions, midsole rim 150, and outsole 160 together before being placed in the mold. Once the portions are placed in the mold, a predetermined amount of heat and a predetermined amount of pressure may be applied for a predetermined amount of time in order to form midsole core 140. Midsole and outsole 160 may be formed using suitable techniques, including, but not limited to, injection molding, blow molding, compression molding, and rotational molding. An example of a mold 1400 for forming the midsole is illustrated in FIG. 14.

FIG. 2 illustrates an exemplary embodiment of a midsole core 200 that includes multiple portions that are arranged in partially overlapping layers. For example, midsole core 200 may have a first layer 210 that may extend from a heel end 202 to an arch 212. A second layer may extend from heel end 202 to a midsole 222. A third layer 230 may extend from heel end 202 to balls 232 of foot. A fourth layer 240 may extend from heel end 202 to a forefoot end 242. While FIG. 2 illustrates midsole core 200 with four layers, the present disclosure is not so limited, and midsole core 200 may have more or fewer than four layers with each layer having the same or varying lengths.

The partial overlapping of layers may provide a gentle transition between sections of the midsole core 200 during use. This may enhance the ride characteristics of article of footwear 100 during running or other activities. The shapes of the layers may provide cushioning properties to appropriate areas of the foot. For example, midsole core 200 may provide cushioning for under the ball of the foot and the heel. The shapes of the layers may be designed for convenience for assembly, optimize cost, and reduce waste.

FIG. 3 illustrates midsole core 200 arranged in a partially of pre-molding overlapping layers 210, 220, 230, and 240 and a midsole rim 300 that may encompass a majority of the perimeter of midsole core 200. Alternatively, midsole core 200 may not include midsole rim 300. Midsole rim 300 may be wrapped around the perimeter of midsole core 200 using a TPU film, a textile, or other material to provide extra support. A majority of the perimeter of each layer 210, 220, 230, and 240 may be arranged with midsole rim 300. Midsole rim 300 may extend around the entirety of the perimeter of fourth layer 240 or alternatively, midsole rim 300 may extend around a majority of the perimeter of fourth layer 240 with a gap 310 located at forefoot end 242. Layers 210, 220, 230, and 240 may be arranged to partially overlap each other in a number of different orders. For example, first layer may be on top, followed by second layer 220, third layer 230, and finally fourth layer 240 on the bottom. Alternatively, first layer 210 may be on bottom, followed by second layer 220, third layer 230, and fourth layer 240 on the top. Other examples may be the second layer 220 on top, followed by fourth layer 240, third layer 230 and first layer 210 on bottom. Layers 210, 220, 230, and 240 may be adhered to each other by adhesive bonding, stitching, welding, a combination thereof, or any other suitable means before being placed in the mold. Alternatively, layers 210, 220, 230, and 240 may be arranged without any adhesive before being placed in the mold. Additionally, layers 210, 220, 230, and 240 may be placed in mold with or without midsole rim 300.

FIG. 4 illustrates an exemplary embodiment of a midsole core 400 that includes multiple pre-molding material strips that extend longitudinally from a heel end 402 and a forefoot end 404, however due to the shape of midsole core 400, not all of the strips extend from heel end 402 to forefoot end 404. The overall shape of midsole core 400 may have the shape of a foot. The strips are arranged side to side to form midsole core 400. For example, midsole core 400 may have a first strip 410 that extends from forefoot end 404 to the midfoot. Second strip 420 extends from forefoot end 404 to the midfoot. Third strip 430 extends from forefoot end 404 to heel end 402. Fourth strip 440 extends from forefoot end 404 to heel end 402. Fifth strip 450 extends from the balls of the foot to heel end 402. Sixth strip 460 extends from the midfoot to heel end 402. A seventh strip 470 extends from the midfoot to heel end 402 and aligns longitudinally with second strip 420. While FIG. 4 illustrates midsole core 400 with seven strips, the present disclosure is not so limited, and midsole core 400 may have more or fewer than seven strips and the length of each strip may vary depending on the shape of midsole core 400.

Figure 5:
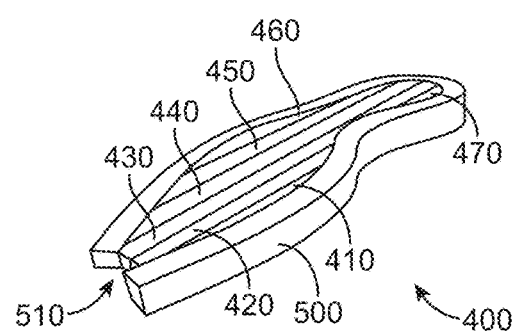
FIG. 5 illustrates a midsole core of an article of footwear having a plurality of pre-molding portions arranged in longitudinal strips and having a midsole rim according to an embodiment.

FIG. 5 illustrates midsole core 400 with multiple pre-molding material strips 410, 420, 430, 440, 450, 460, and 470 and a midsole rim 500 that may encompass a majority of the perimeter of midsole core 400. Alternatively, midsole core 400 may not include midsole rim 500. Midsole rim 500 may be wrapped around the perimeter of midsole core 400 using a TPU film, a textile, or other material to provide extra support. Midsole rim 500 may extend around the entirety of the perimeter midsole core 400, or alternatively, midsole rim 500 may extend around a majority of the perimeter of midsole core 400 with a gap 510 located at forefoot end 404.

Multiple strips 410, 420, 430, 440, 450, 460, and 470 may be adhered to each other side to side by adhesive bonding, stitching, welding, a combination thereof, or any other suitable means before being placed in the mold. Alternatively, multiple strips 410, 420, 430, 440, 450, 460, and 470 may be arranged without any adhesive before being placed in the mold. Additionally, strips 410, 420, 430, 440, 450, 460, and 470 may be placed in mold with or without midsole rim 500.

Figure 6:
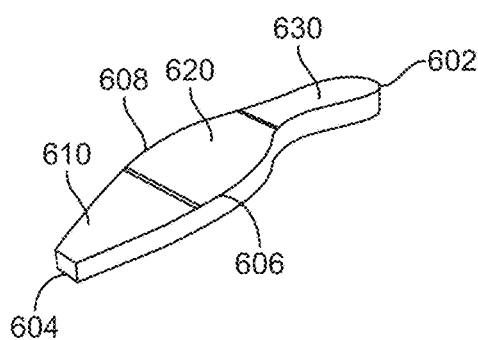
FIG. 6 illustrates a midsole core of an article of footwear having a plurality of pre-molding portions arranged in lateral strips according to an embodiment.

FIG. 6 illustrates an exemplary embodiment of a midsole core 600 that includes multiple portions that extend from a medial side 606 of midsole core 600 to a lateral side 608 of midsole core 600. A forefoot portion 610 extends from a forefoot end 604 to a front of the arch. A midfoot portion 620 extends from the front of the arch to an end of the arch. A heel portion 630 extends form the end of the arch to a heel end 602. While FIG. 6 illustrates three portions, the present disclosure is not so limited, and midsole core 600 may have more or fewer than three portions or varying lengths.

Figure 7:
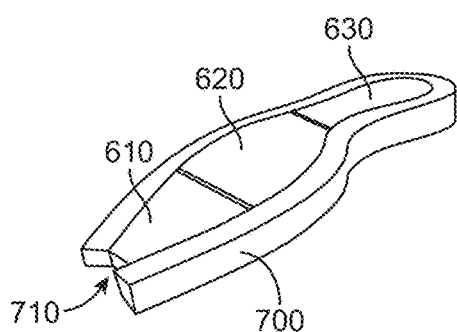
FIG. 7 illustrates a midsole core of an article of footwear having a plurality of pre-molding portions arranged in lateral strips and having a midsole rim according to an embodiment.

FIG. 7 illustrates midsole core 600 with multiple portions 610, 620, and 630 and a midsole rim 700 that may encompass a majority of the perimeter of midsole core 600. Alternatively, midsole core 600 may not include midsole rim 700. Midsole rim 700 may be wrapped around the perimeter of midsole core 600 using a TPU film, a textile, or other material to provide extra support. Midsole rim 700 may extend around the entirety of the perimeter of the multiple portions 610, 620, and 630. Alternatively, midsole rim 700 may extend around a majority of the perimeter of the multiple portions 610, 620, and 630 with a gap 710 located at forefoot end 604. Multiple portions 610, 620, and 630 may be adhered to each other front to back by adhesive bonding, stitching, welding, a combination thereof, or any other suitable means before being placed in the mold. Alternatively, multiple portions 610, 620, and 630 may be arranged without any adhesive before being placed in the mold. Additionally, multiple portions 610, 620, and 630 may be placed in mold with or without midsole rim 500.

Figure 8:
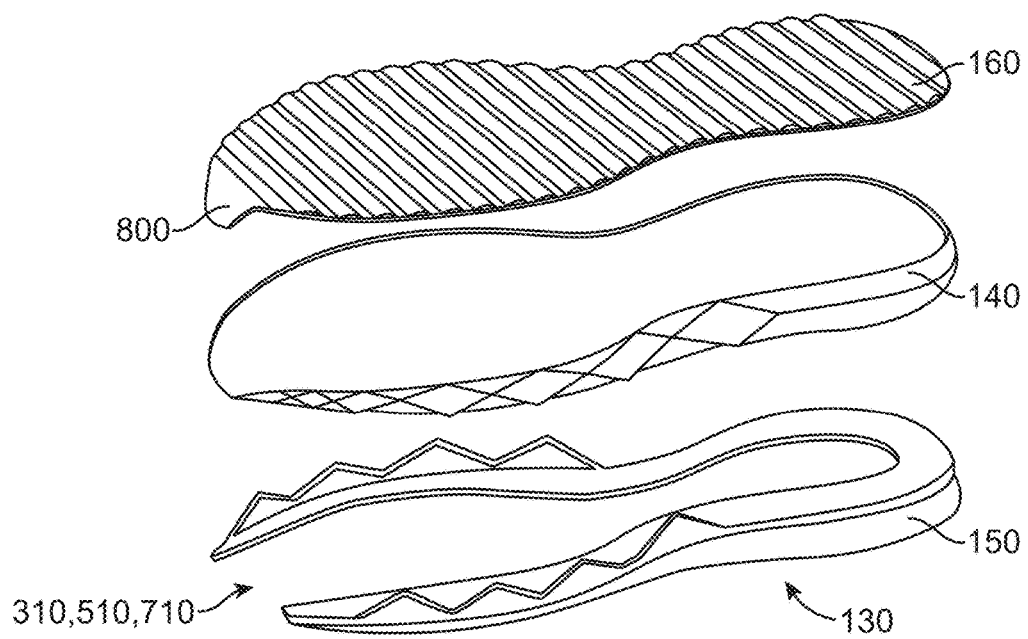
FIG. 8 illustrates an exploded view of a midsole for an article of footwear having an outsole, a midsole core, and a midsole rim according to an embodiment.

FIG. 8 illustrates an exemplary embodiment an exploded view of sole 130 including midsole core 140, midsole rim 150 and outsole 160. Midsole rim 150 may define gap 310, 510, or 710, as previously discussed. Outsole 160 may have a flap 800 at forefoot end 102 that fills in gap 310, 510, or 710 of midsole rim 150.

In some embodiments, midsole core 140, midsole rim 150, and outsole 160 may comprise different materials to provide different characteristics to different portions of sole 130. For example, midsole core 140 may be fabricated from TPE. In another embodiment, midsole core 140 may comprise PEBA. In another embodiment, midsole core 140 may consist of PEBA, meaning, midsole core 140 is fabricated solely from PEBA. Midsole rim 150 may be fabricated of CMEVA and outsole 160 may be fabricated from rubber. In some embodiments, midsole core 140, midsole rim 150 and outsole 160 may have different hardness characteristics. In some embodiments, the material hardness of outsole 160 may range from about 50 Asker C to about 60 Shore D, for example, about 60 C to about 75 C or about 65 C to about 70 C. In some embodiments, the material hardness of midsole core 140 may range from about 20 C to about 70 C, for example, about 40 C to about 60 C or about 50 C to about 55 C.

In some embodiments, the material density of outsole 160 may be about 0.3 to about 0.5 grams/cubic centimeter (g/cm$^3$), for example, such about 0.35 to about 0.4 g/cm$^3$. In some embodiments, the material density of midsole core 140 may be about 0.9 to about 1.2 g/cm3, for example, such as about 1.0 to about 1.12 g/cm$^3$. In some embodiments, the material density of outsole 160 is lower than the material density of midsole core 140. For example, in some embodiments, the material density of outsole 160 may be about 0.35 to about 0.4 g/cm$^3$ and the material density of midsole core 140 may be about 0.9 to about 1.2 g/cm3. In some embodiments, the material density of outsole 160 may be lower than, or even equal to, the material density of midsole core 140.

In some embodiments, the material of outsole 160 may have higher modulus than the material of midsole core 140. In some embodiments, the material of outsole 160 may have a modulus that is lower, or even equal to, than the material of midsole core 140.

As discussed previously, midsole core 140, midsole rim 150, and outsole 160 may be discrete components that are formed separately and attached. Alternatively, midsole core 140, midsole rim 150, and outsole 160 may be arranged and placed together into mold 1400. In some embodiments, midsole core 140, midsole rim 150, and outsole 160 may be adhered to each together via, for example, but not limited to, adhesive bonding, stitching, welding, a combination thereof, or any other suitable means, before being placed in mold 1400. In some embodiments, midsole core 140 may be attached to outsole 160 via an adhesive disposed between midsole core 140 and outsole 160.

Figure 9:
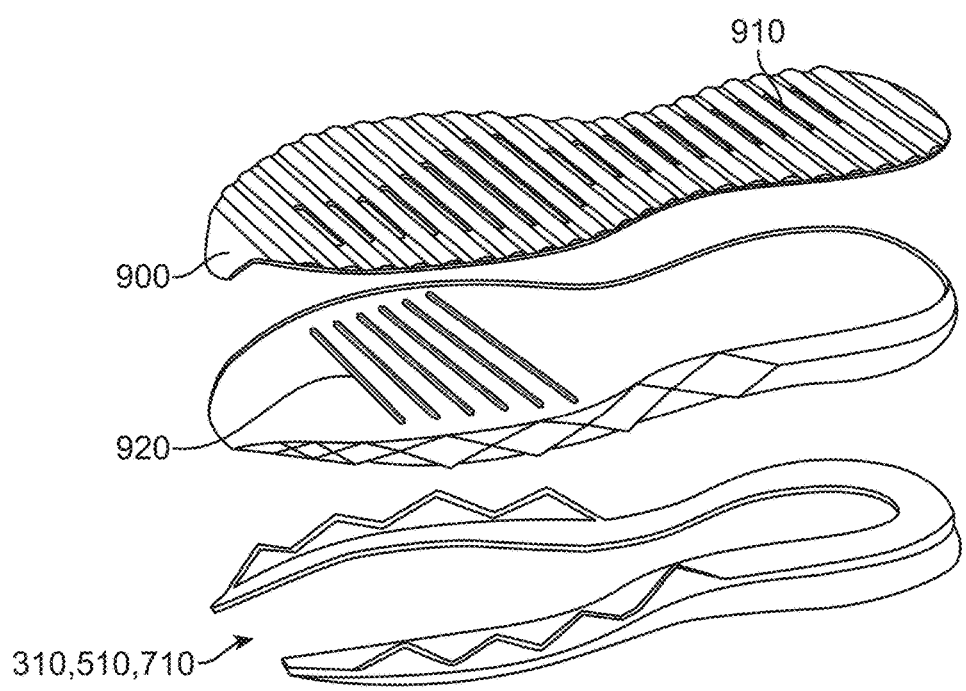
FIG. 9 illustrates an exploded view of a midsole for an article of footwear having an outsole, a midsole core, and a midsole rim according to an embodiment.

FIG. 9 illustrates an exemplary embodiment of an exploded view of sole 130 including midsole core 140, midsole rim 150, and outsole 160. Midsole rim 150 may define gap 310, 510, or 710, as previously discussed. Outsole 160 may have a flap 900 at forefoot end 102 that fills in gap 310, 510, or 710 of midsole rim 150. Outsole 160 may define multiple openings 910 of varying lengths that extend in the width wide direction of outsole 160. Multiple openings 910 may be arranged in the width wide direction and multiple openings 910 span the length of outsole 160. Midsole core 140 may define multiple openings or slots 920 that extend in the width wide direction of midsole core 140. Multiple openings 920 may be arranged only within forefoot portion 110, only within midfoot portion 112, or only within heel portion 114. Alternatively, multiple openings 920 may span the length of midsole core 140. Openings 920 may reduce weight of the outsole 160, increase the flexibility of the outsole 160, or add aesthetic qualities to outsole 160.

Figure 10:
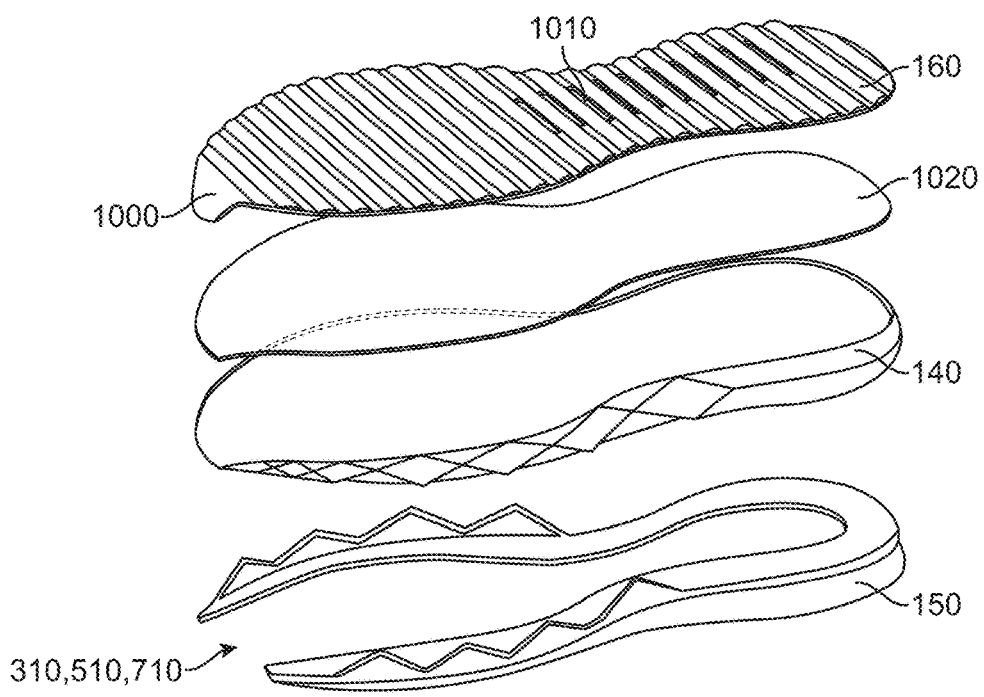
FIG. 10 illustrates an exploded view of a midsole for an article of footwear having an outsole, a film, a midsole core, and a midsole rim according to an embodiment.

FIG. 10 illustrates an exemplary embodiment of an exploded view of sole 130 including midsole core 140, midsole rim 150, and outsole 160. Midsole rim 150 may define gap 310, 510, or 710, as previously discussed. Outsole 160 may have a flap 1000 at forefoot end 102 that fills in gap 310, 510, or 710 of midsole rim 150. Outsole 160 may define multiple openings 1010 of varying lengths that extend in the width wide direction and multiple openings 1010 may span heel portion 114. Sole 130 may further include a film 1020 that extends the length of sole 130 from forefoot end 102 to heel end 104. Film 1020 may be fabricated from TPU. Film 1020 may have a thickness ranging from 0.3 mm to 1.2 mm. Film 1020 may protect midsole core 140 from tearing, puncturing, and the like. In addition, film 1020 may have colors and/or graphics in order to provide aesthetic qualities to article of footwear 100. The colors and/or graphics may be visible through openings 1010.

Figure 11:
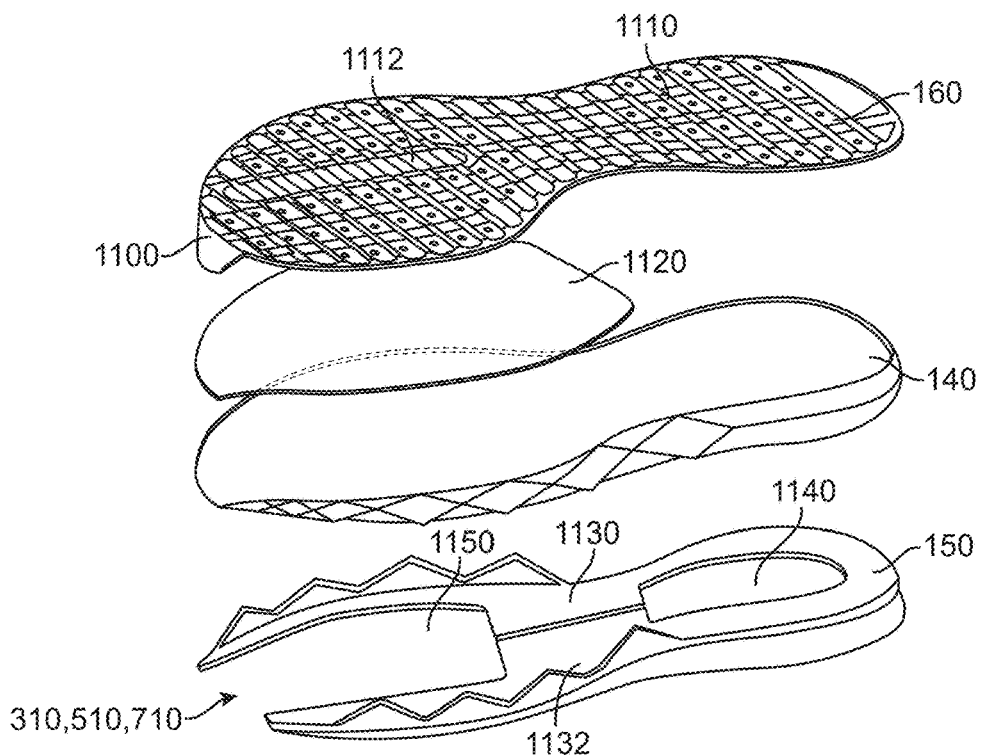
FIG. 11 illustrates an exploded view of a midsole for an article of footwear having an outsole, a film, a midsole core, and a midsole rim according to an embodiment.

FIG. 11 illustrates an exemplary embodiment of an exploded view of sole 130 including midsole core 140, midsole rim 150, and outsole 160. Midsole rim 150 may define gap 310, 510, or 710, as previously discussed. Midsole rim 150 may further comprise lateral projections 1130 and 1132 that project inward. Midsole rim 150 and projections 1130 and 1132 may define openings 1140 and 1150 that may interact with corresponding portions of midsole core 140. Outsole 160 may have a flap 1100 at forefoot end 102 that fills in gap 310, 510, or 710 of midsole rim 150. Outsole 160 may define multiple openings 1110 and 1112 of various sizes and various lengths that extend in the width wide direction and span the length of outsole 160. Sole 130 may further include a film 1120 that may extend a portion of the length of sole 130 from forefoot end 102 to either midsole portion 112 or heel portion 114. Film 1020 may be fabricated from TPU.

Figure 12:
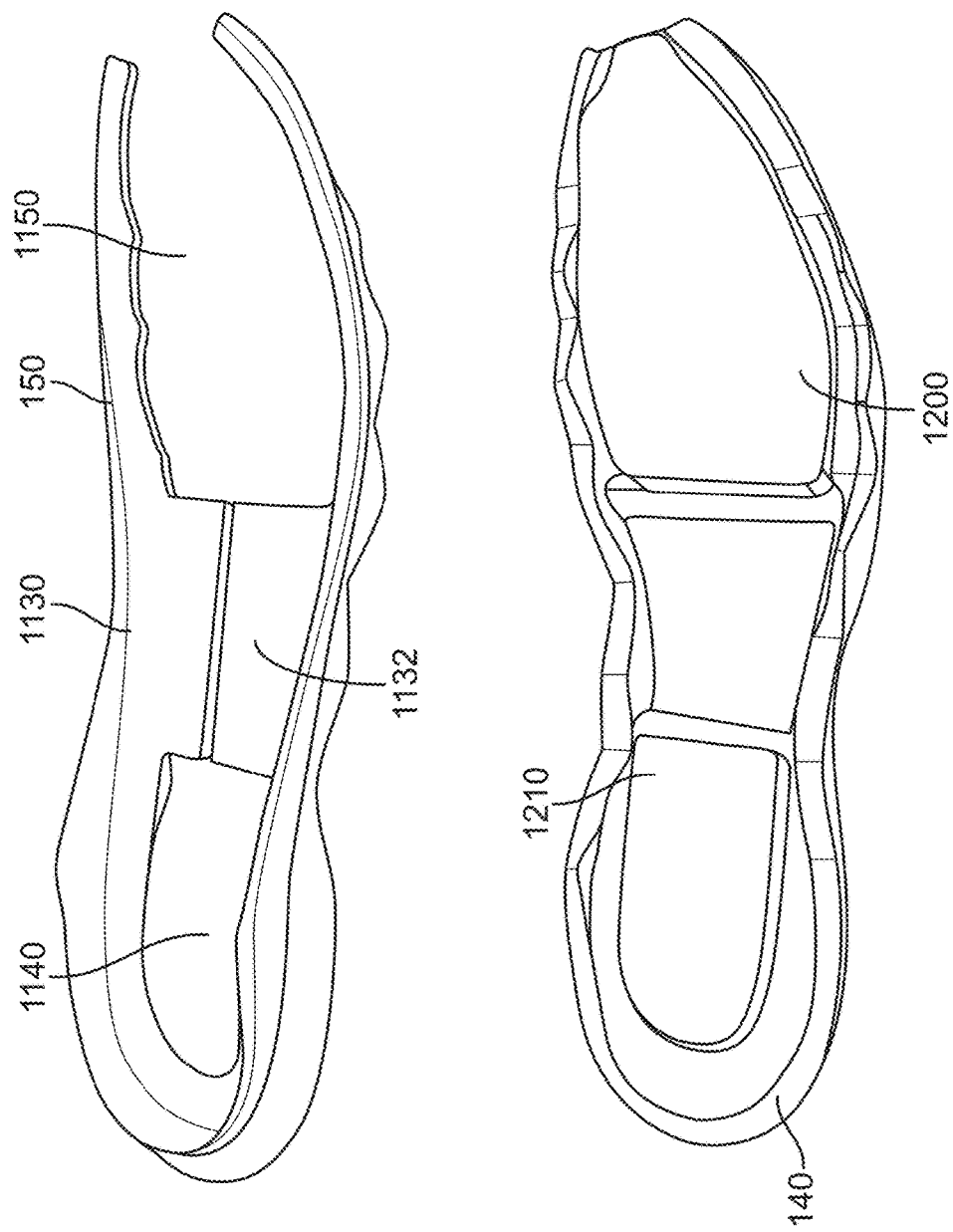
FIG. 12 illustrates an exploded view of a midsole for an article of footwear having a midsole core, and a midsole rim according to an embodiment.

FIG. 12 illustrates an exemplary embodiment of an exploded view of midsole core 140 and midsole rim 150. Midsole rim 150 may include lateral projections 1130 and 1132 that project inward. Lateral projections 1130 and 1132 may also connect to each other and create a unitary lateral support to increase the stability of midsole rim 150. Midsole rim 150 and projections 1130 and 1132 may define openings 1140 and 1150. Opening 1140 may be in the heel area of the foot and opening 1150 may be in the ball area of the foot. Openings 1140 and 1150 may interact with corresponding portions 1200 and 1210 of midsole core 140. Portions 1200 and 1210 may project upwards to interact with midsole rim 150.

Figure 13:
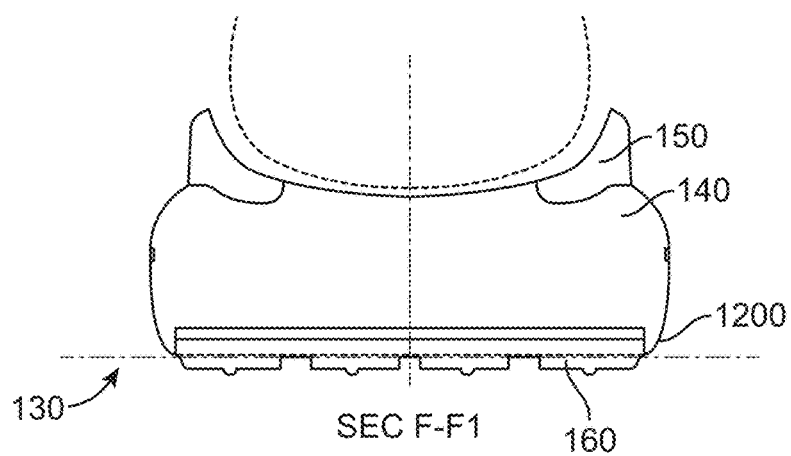
FIG. 13 illustrates a cross-sectional view of the article of footwear according to an embodiment.

FIG. 13 illustrates a cross-sectional view of sole 130, including midsole core 140, midsole rim 150, and outsole 160. Midsole core 140 may form a lip 1200 around outsole 160. Lip 1200 may encompasses the entirety of outsole 160, or alternatively, lip 1200 may encompass a majority of outsole 160 except for flap 800, 900, 1000, or 1100.

FIG. 14 illustrates mold 1400 for manufacturing the midsole and outsole 160. The midsole and outsole 160 may be manufactured using suitable techniques, including, but not limited to, injection molding, blow molding, compression molding, and rotational molding. As discussed previously, midsole core 140 may be manufacture from multiple smaller portions instead from a larger piece for the entire midsole core 140. The portions may be cut from the material used for midsole core 140, such as thermoplastic elastomer foam sheet. The portions may be cut in a predetermined manner so that the portions may be arranged in a particular order to form the midsole core 140. However, the portions may also be cut from the foam sheet in an optimized manner so that the surface area of the foam sheet may be maximized for the portions, instead of waste. The size of the portions may vary in order to optimize the surface area of the foam sheet. Further, foam sheets may have a variety of different portion shapes in order to optimize the surface area of the foam sheet. As discussed previously, the portions may be cut according to the above-described embodiments (e.g., layers, strips, portions, etc.). However, different patterns or shapes for the portions may be cut from the foam sheet without departing from the scope of the present disclosure.

After the portions are cut from the thermoplastic elastomer, the portions may be arranged in a particular order to form the midsole core 140. Midsole core 140 may then be placed into mold 1400 with or without adhering all of the portions together. Once the portions are placed in the mold, a predetermined amount of heat and a predetermined amount of pressure may be applied for a predetermined amount of time in order to form midsole core 140. For example, the temperature of the mold may be between about 135° C. to about 180° C., and the time in the mold may range between about 530-570 seconds. After the midsole core 140 is removed from the mold 1400, midsole core 140 may be placed in a cooling station to cool midsole core 140. Cooling station may use a water cooling system and midsole core 140 may be placed in the cooling station for about 350-440 seconds. Midsole core 140 may be formed in mold 1400 with or without midsole rim 150 and with or without outsole 160.

Once the midsole core 140, midsole rim 150, and outsole 160 are fabricated, these components may be attached to the upper to form article of footwear 100. The midsole for article of footwear 100 may include midsole core 140 and midsole rim 150, or alternatively, the midsole may simply be midsole core 140. The components of article of footwear 100 may be adhered to each other by adhesive bonding, stitching, welding, a combination thereof, or any other suitable means.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method of manufacturing a component of an article of footwear from a sheet of thermoplastic elastomer foam, comprising:
cutting a plurality of pieces from one or more thermoplastic elastomer foam sheets;
arranging the plurality of cut pieces in at least partially overlapping layers to form a pre-molded core of a midsole, wherein the plurality of cut pieces vary in length as measured from a heel of the midsole toward a toe of the midsole;

placing the arranged plurality of cut pieces in a mold; and applying heat and pressure to the plurality of cut pieces for a predetermined amount of time to form a unitary molded midsole.

2. The method of claim 1, further comprising adhering the plurality of cut pieces to each other via at least one of adhesive bonding, stitching, and welding to form the core of the midsole prior to placing the arranged plurality of cut pieces in the mold.

3. The method of claim 1, further comprising:

adhering the plurality of cut pieces to a rim;

placing the plurality of cut pieces and the rim in the mold; and applying heat and pressure to the plurality of cut pieces and the rim for a predetermined amount of time to form the midsole.

4. The method of claim 1, further comprising arranging the plurality of cut pieces in:

a first layer comprising a first cut piece;

a second layer comprising a second cut piece having a length that is greater than a length of the first layer; and a third layer comprising a third cut piece having a length that is greater than the length of the second layer.

5. The method of claim 4, further comprising a fourth layer having a length that is greater than the length of the third layer.

6. The method of claim 1, wherein the thermoplastic elastomer foam is polyether block amide.

7. The method of claim 1, wherein the midsole defines a plurality of openings that extend in a width wide direction of the midsole.

8. The method of claim 1, further comprising adhering the midsole to an outsole.

9. The method of claim 8, wherein the outsole defines a plurality of openings that extend in a width wide direction of the outsole.

10. The method of claim 8, further comprising adhering a thermoplastic polyurethane film between the midsole and the outsole.

11. The method of claim 8, wherein the midsole and the outsole are placed in the mold together.

12. A method of manufacturing a component of an article of footwear, comprising:

cutting a plurality of cut pieces from a thermoplastic elastomer foam sheet;

arranging the plurality of cut pieces to form a pre-molded core of a midsole, wherein each of the plurality of cut pieces has a different length as measured from a heel of the midsole toward a toe of the midsole;

placing the arranged plurality of cut pieces in a mold; and applying heat and pressure to the plurality of cut pieces for a predetermined amount of time to form the midsole.

13. The method of claim 12, further comprising arranging the plurality of cut pieces in at least partially overlapping layers.

14. The method of claim 12, wherein the plurality of cut pieces comprises a first layer, a second layer, and a third layer, wherein arranging the plurality of cut pieces further comprises:

arranging the first layer on the second layer, wherein the second layer has a length that is greater than a length of the first layer; and arranging the second layer on the third layer, wherein the third layer has a length that is greater than the length of the second layer.

15. The method of claim 12, wherein the thermoplastic elastomer foam is polyether block amide.

16. The method of claim 12, further comprising adhering the plurality of cut pieces to each other via adhesive bonding, stitching, welding, or a combination thereof prior to placing the arranged plurality of cut pieces in the mold.

* * * * *